United States Patent
Gehringer et al.

(10) Patent No.: US 9,284,903 B2
(45) Date of Patent: Mar. 15, 2016

(54) SYSTEM AND METHOD FOR ADJUSTING ENGINE SPEED AND/OR ENGINE LOAD TO IMPROVE FUEL ECONOMY WITHOUT CAUSING VEHICLE VIBRATION THAT IS PERCEIVABLE BY A VEHICLE OCCUPANT

(71) Applicant: GM Global Technology Operations LLC, Detroit, MI (US)

(72) Inventors: Mark Gehringer, Milford, MI (US); Nitish J. Wagh, Northville, MI (US); Daniel Robert Mandernack, Okemos, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 202 days.

(21) Appl. No.: 14/143,267

(22) Filed: Dec. 30, 2013

(65) Prior Publication Data

US 2015/0184600 A1 Jul. 2, 2015

(51) Int. Cl.
| | |
|---|---|
| *F02D 41/14* | (2006.01) |
| *F02D 35/02* | (2006.01) |
| *G01H 1/10* | (2006.01) |
| *B60W 10/06* | (2006.01) |
| *B60W 10/10* | (2012.01) |
| *B60W 30/188* | (2012.01) |
| *F02D 41/00* | (2006.01) |
| *F02D 31/00* | (2006.01) |
| *G01H 1/06* | (2006.01) |
| *F02D 41/02* | (2006.01) |

(52) U.S. Cl.
CPC ........... *F02D 41/1498* (2013.01); *B60W 10/06* (2013.01); *B60W 10/10* (2013.01); *B60W 30/1882* (2013.01); *F02D 31/001* (2013.01); *F02D 35/02* (2013.01); *F02D 41/0087* (2013.01); *F02D 41/14* (2013.01); *G01H 1/10* (2013.01); *F02D 41/021* (2013.01); *G01H 1/06* (2013.01)

(58) Field of Classification Search
CPC ..... F02D 41/14; F02D 41/1498; F02D 35/02; G01H 1/06; G01H 1/10
USPC ............ 123/350, 319, 320, 330, 681, 406.35, 123/192.1; 701/102, 110, 111
See application file for complete search history.

(56) References Cited

U.S. PATENT DOCUMENTS

| | | | |
|---|---|---|---|
| 4,245,471 | A | 1/1981 | Sugasawa et al. |
| 4,489,685 | A | 12/1984 | Kinoshita et al. |
| 5,408,974 | A | 4/1995 | Lipinski et al. |

(Continued)

FOREIGN PATENT DOCUMENTS

JP 2010156359 A * 7/2010

OTHER PUBLICATIONS

U.S. Appl. No. 14/300,469, filed Jun. 10, 2014, Li et al.

*Primary Examiner* — Mahmoud Gimie

(57) ABSTRACT

A system according to the principles of the present disclosure includes a vibration level module and an engine operation control module. The vibration level module estimates a first level of vibration in a vehicle due to contact between tires of the vehicle and a road surface as the vehicle travels over the road surface. The vibration level module estimates a second level of vibration in the vehicle due to an engine in the vehicle. The engine operation control module selectively adjusts at least one of a speed of the engine and a load on the engine when the second vibration level is less than the first vibration level.

20 Claims, 3 Drawing Sheets

(56) References Cited

U.S. PATENT DOCUMENTS

| | | |
|---|---|---|
| 5,540,633 A | 7/1996 | Yamanaka et al. |
| 5,568,795 A | 10/1996 | Robichaux et al. |
| 7,044,101 B1 | 5/2006 | Duty et al. |
| 7,203,579 B2 * | 4/2007 | Yokota ................ B60C 23/0477 303/150 |
| 7,278,391 B1 | 10/2007 | Wong et al. |
| 2005/0154524 A1 * | 7/2005 | Matsuda ................ F02D 31/002 701/110 |
| 2006/0107919 A1 | 5/2006 | Nishi et al. |
| 2008/0264149 A1 * | 10/2008 | Hazelton .............. F02D 41/2432 73/35.06 |
| 2015/0204442 A1 * | 7/2015 | Kishi ................ F16H 61/66259 701/58 |

* cited by examiner

SYSTEM AND METHOD FOR ADJUSTING ENGINE SPEED AND/OR ENGINE LOAD TO IMPROVE FUEL ECONOMY WITHOUT CAUSING VEHICLE VIBRATION THAT IS PERCEIVABLE BY A VEHICLE OCCUPANT

FIELD

The present disclosure relates to internal combustion engines, and more specifically, to systems and methods for adjusting engine speed and/or engine load to improve fuel economy without causing vehicle vibration that is perceivable by a vehicle occupant.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system according to the principles of the present disclosure includes a vibration level module and an engine operation control module. The vibration level module estimates a first level of vibration in a vehicle due to contact between tires of the vehicle and a road surface as the vehicle travels over the road surface. The vibration level module estimates a second level of vibration in the vehicle due to an engine in the vehicle. The engine operation control module selectively adjusts at least one of a speed of the engine and a load on the engine when the second vibration level is less than the first vibration level.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

To maximize fuel economy, control systems and methods typically maximize engine load and minimize engine speed for a given vehicle operating condition. The amplitude of engine vibration generally increases as the engine load is increased and decreases as the engine speed is increased. Therefore, adjusting the engine load and speed to values that maximize fuel economy generally increases engine vibration. This increased engine vibration may be perceived by vehicle occupants as objectionable.

The ability of occupants to perceive engine vibration depends on the level of background or masking vibration present at the occupant interfaces (e.g., pedals, seat, and steering wheel). Masking vibration is vibration due to sources other than the engine, such as vibration due to contact between tires of a vehicle and a road surface. As the level of masking vibration increases, the level of engine vibration that can be tolerated by a vehicle occupant without being perceived as objectionable increases.

To avoid causing engine vibration that is objectionable to the vehicle occupants, control systems and methods typically limit the engine load and speed to load/speed combinations that yield an acceptable level of engine vibration. The limits placed on the engine load and speed may be based on worst-case conditions for perceptibility of engine vibration, such as traveling on a smooth road surface. Since most road surfaces are not smooth, limiting the engine speed and load in this manner typically results in higher engine speed and lower engine load than optimal for fuel economy.

A system and method according to the principles of the present disclosure estimates the level of masking vibration and adjusts the engine speed and/or engine load to maximize fuel economy without yielding objectionable vehicle vibration. If the level of vehicle vibration due to the engine is less than the level of masking vibration, the system and method decreases the engine speed and/or increases the engine load when doing so will improve the fuel efficiency of the engine. In this manner, the system and method utilizes the masking vibration to maximize the fuel efficiency of the engine.

The system and method may estimate the masking vibration level based on an input from a wheel speed sensor, a transmission output speed sensor, an accelerometer mounted on a chassis (e.g., a body and/or a frame), and/or a suspension motion sensor. The system and method may estimate the masking vibration level at a frequency that is within a predetermined range of the frequency of vehicle vibration due to the engine. The system and method may determine the frequency of vehicle vibration due to the engine based on the firing frequency of the engine.

Figure 1:
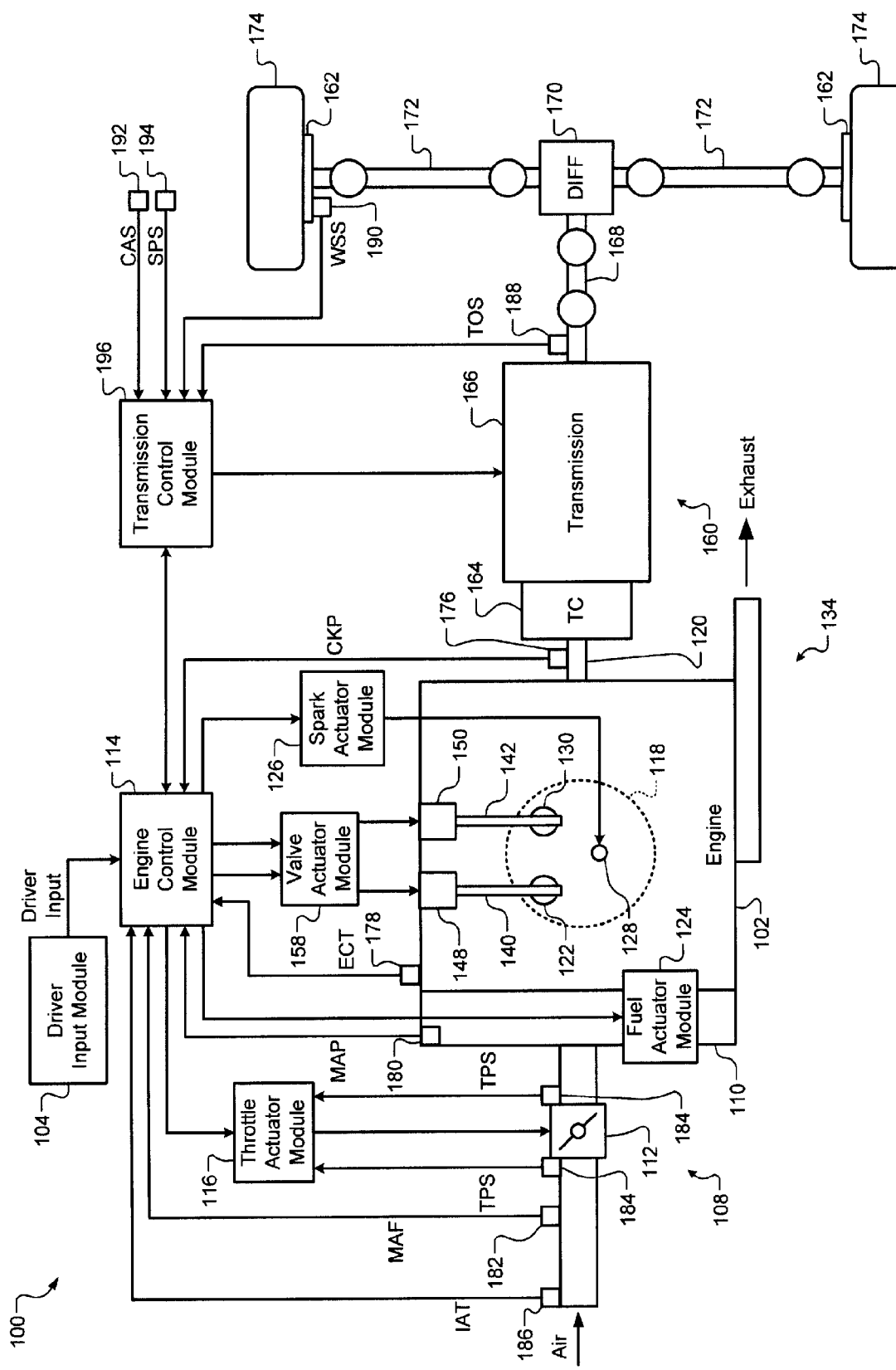
FIG. 1 is a functional block diagram of an example engine system according to the principles of the present disclosure.

Referring now to FIG. 1, vehicle system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft 120, two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft 120. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148, 150 based on signals from the ECM 114. When implemented, variable valve lift may also be controlled by the valve actuator module 158.

The valve actuator module 158 may deactivate the cylinder 118 by disabling opening of the intake valve 122 and/or the exhaust valve 130. The valve actuator module 158 may disable opening of the intake valve 122 by decoupling the intake valve 122 from the intake cam phaser 148. Similarly, the valve actuator module 158 may disable opening of the exhaust valve 130 by decoupling the exhaust valve 130 from the exhaust cam phaser 150. In various implementations, the valve actuator module 158 may control the intake valve 122 and/or the exhaust valve 130 using devices other than camshafts, such as electromagnetic or electrohydraulic actuators.

Torque output at the crankshaft 120 is transferred through a drivetrain system 160 to wheels 162. The drivetrain system 160 includes a torque converter 164, a transmission 166, a drive shaft 168, a differential 170, and axle shafts 172. The torque converter 164, the transmission 166, and the differential 170 amplify engine torque by several gear ratios to provide axle torque at the axle shafts 172. The axle torque rotates the wheels 162 and tires 174 mounted on the wheels 162. When the tires 174 are contacting ground, rotation of the tires 174 moves the vehicle forward or backward.

The engine system 100 may measure the position of the crankshaft 120 using a crankshaft position (CKP) sensor 176. The temperature of the engine coolant may be measured using an engine coolant temperature (ECT) sensor 178. The ECT sensor 178 may be located within the engine 102 or at other locations where the coolant is circulated, such as a radiator (not shown).

The pressure within the intake manifold 110 may be measured using a manifold absolute pressure (MAP) sensor 180. In various implementations, engine vacuum, which is the difference between ambient air pressure and the pressure within the intake manifold 110, may be measured. The mass flow rate of air flowing into the intake manifold 110 may be measured using a mass air flow (MAF) sensor 182. In various implementations, the MAF sensor 182 may be located in a housing that also includes the throttle valve 112.

The throttle actuator module 116 may monitor the position of the throttle valve 112 using one or more throttle position sensors (TPS) 184. The ambient temperature of air being drawn into the engine 102 may be measured using an intake air temperature (IAT) sensor 186. The output speed of the transmission 166 may be measured using a transmission output speed (TOS) sensor 188. The speed of the wheels 162 may be measured using a wheel speed sensor (WSS) 190.

The acceleration of a chassis (not shown) on which the engine 102 is mounted may be measured using a chassis acceleration sensor (CAS) 192. The chassis may include a body and/or a frame. The position of a suspension component (e.g., a control arm) relative to the chassis may be measured using a suspension position sensor (SPS) 194. In one example, the SPS sensor 194 is a ride height sensor mounted between the suspension component and the chassis. The ECM 114 may use signals from the sensors to make control decisions for the engine system 100.

The ECM 114 may communicate with a transmission control module (TCM) 196 to coordinate shifting gears in the transmission 166. For example, the ECM 114 may reduce engine torque during a gear shift. Although some of the sensor signals are shown provided to the TCM 196, the TCM 196 may relay these sensor signals to the ECM 114. Alternatively, these sensor signals may be provided to the ECM 114 directly. In various implementations, various functions of the ECM 114 and the TCM 196 may be integrated into one or more modules.

Figure 2:
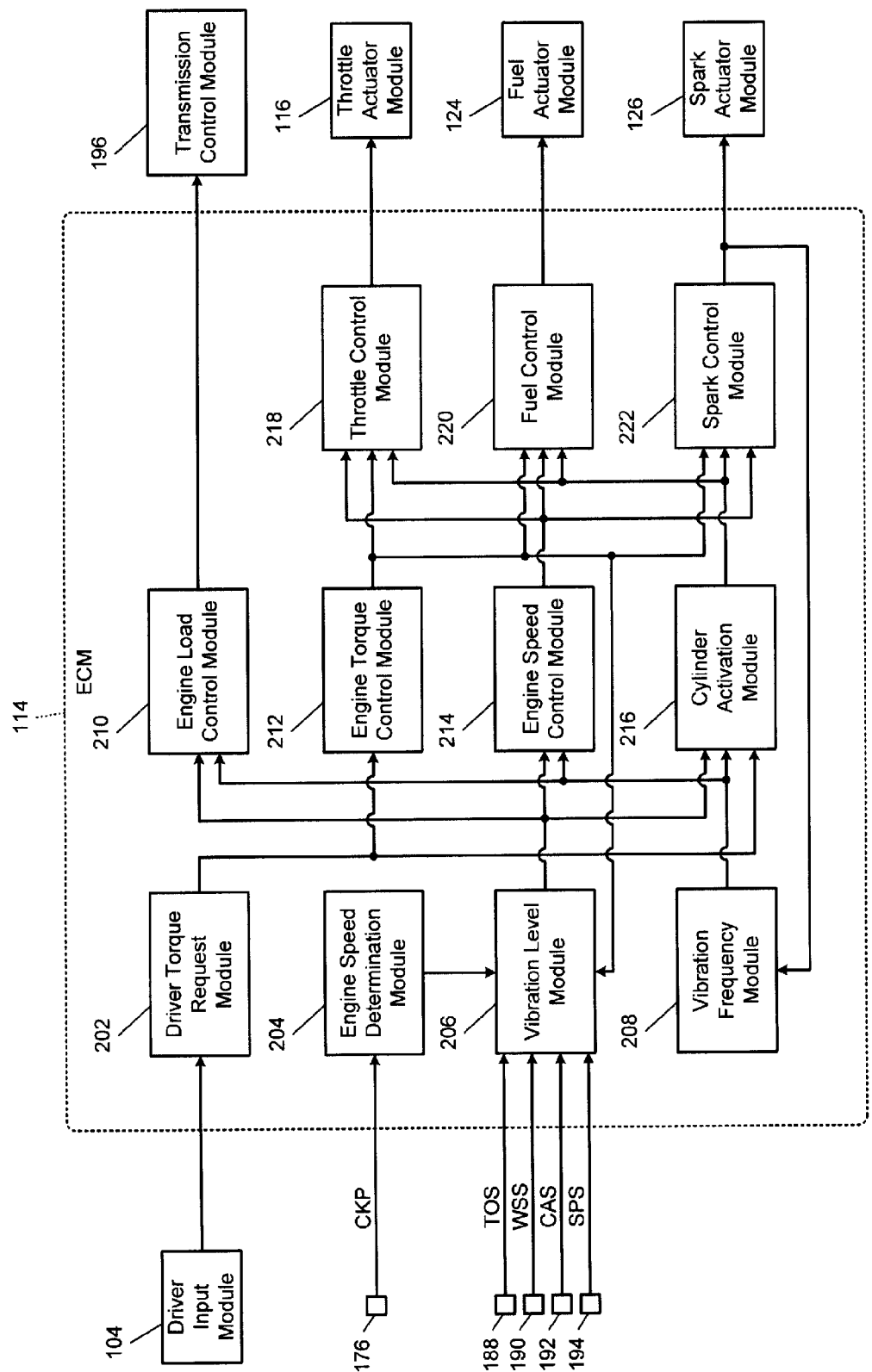
FIG. 2 is a functional block diagram of an example control system according to the principles of the present disclosure.

Referring now to FIG. 2, an example implementation of the ECM 114 includes a driver torque request module 202. The driver torque request module 202 determines a driver torque request based on the driver input from the driver input module 104. The driver torque request module 202 may store one or more mappings of accelerator pedal position to desired torque, and may determine the driver torque request based on a selected one of the mappings. The driver torque request module 202 outputs the driver torque request.

An engine speed determination module 204 determines engine speed. The engine speed determination module 204 may determine the engine speed based on the crankshaft position from the CKP sensor 176. For example, the engine speed determination module 204 may determine the engine speed based on a period of crankshaft rotation corresponding to a number of tooth detections. The engine speed determination module 204 outputs the engine speed.

A vibration level module 206 estimates the amplitude or level of vibration in the vehicle due to various sources. The vibration level module 206 estimates a first level of vibration in the vehicle due to contact between the tires 174 of the vehicle and a road surface (not shown) as the vehicle travels over the road surface. The first vibration level may be referred to as a masking vibration level. The vibration level module 206 may estimate the first vibration level based on the transmission output speed from the TOS 188, the wheel speed from the WSS 190, the chassis acceleration from the CAS 192, and/or the suspension position from the SPS 194. The vibration level module 206 may estimate the first vibration level based on a time derivative (e.g., a first and/or second order derivative) or an integral of the transmission output speed, the wheel speed, the chassis acceleration, and/or the suspension position.

The vibration level module 206 estimates a second level of vibration in the vehicle due to the engine 102. The vibration level module 206 may estimate the second vibration level based on a commanded engine torque based on a predetermined relationship between the commanded engine torque and the second vibration level. The predetermined relationship may be embodied in a lookup table and/or an equation. The vibration level module 206 outputs the first and second vibration levels.

A vibration frequency module 208 determines the frequency of vibration in the vehicle due to various sources. The vibration frequency module 208 may determine a first frequency of vehicle vibration due to the engine 102 based on a firing frequency of the engine 102. For example, the vibration frequency module 208 may set the first frequency equal to the firing frequency of the engine 102. The vibration frequency module 208 outputs the first frequency.

The vibration level module 206 may estimate the first vibration level at a second frequency that is within a predetermined range of the first frequency. In one example, the vibration level module 206 uses a Fourier transform to obtain a frequency distribution of a raw signal indicating the transmission output speed, the wheel speed, the chassis acceleration, or the suspension position. In another example, the vibration level module 206 uses a Fourier transform to obtain a frequency distribution of a time derivative of the raw signal. In either example, the vibration level module 206 estimates the first vibration level based on a peak in the frequency distribution that is within a predetermined range of the first frequency.

An engine load control module 210 controls the amount of load on the engine 102. The engine load control module 210 may adjust the engine load by commanding the TCM 196 to shift the transmission 166. The engine load control module 210 may decrease the engine load by commanding a downshift and increase the engine load by commanding an upshift.

The engine load control module 210 may increase the engine load when the first vibration level is greater than the second vibration level and increasing the engine load will increase the fuel efficiency of the engine 102. The engine load control module 210 may determine whether increasing the engine load will increase the fuel efficiency of the engine 102 based on a predetermined relationship between the engine load and the fuel efficiency of the engine 102. The predetermined relationship may be embodied in a lookup table and/or an equation, and may vary depending on the engine speed.

An engine torque control module 212 controls the amount of torque produced by the engine 102 by outputting a desired engine torque, which may be referred to as the commanded engine torque. The engine torque control module 212 may determine the desired engine torque based on the driver torque request and/or other torque requests. The other torque requests may include, for example, torque reductions for engine over-speed protection, torque increases for stall prevention, and torque reductions requested by the TCM 196 to accommodate gear shifts. The engine torque control module 212 outputs the commanded engine torque.

An engine speed control module 214 controls the engine speed by outputting a desired engine speed. The engine speed control module 214 may decrease the engine speed when the first vibration level is greater than the second vibration level and decreasing the engine speed will increase the fuel efficiency of the engine 102. The engine speed control module 214 may determine whether increasing the engine speed will increase the fuel efficiency of the engine 102 based on a predetermined relationship between the engine speed and the fuel efficiency of the engine 102. The predetermined relationship may be embodied in a lookup table and/or an equation, and may vary depending on the engine load.

In various implementations, the engine load control module 210 and the engine speed control module 214 may adjust limits applied to the engine load and the engine speed instead of adjusting the engine load and the engine speed. For example, the engine load control module 210 may increase an upper limit applied to the engine load when the first vibration level is greater than the second vibration level and increasing the engine load will increase the fuel efficiency of the engine 102. In another example, the engine speed control module 214 may decrease a lower limit applied to the engine speed when the first vibration level is greater than the second vibration level and decreasing the engine speed will increase the fuel efficiency of the engine 102. The modules 210, 214 may store the engine load/speed limits in a lookup table.

A cylinder activation module 216 may deactivate cylinders in the engine 102 based on the driver torque request. The cylinder activation module 216 may deactivate one or more (e.g., all) cylinders in the engine 102 when the engine 102 can satisfy the driver torque request while the cylinder(s) are deactivated. The cylinder activation module 216 may reactivate the cylinders when the engine 102 cannot satisfy the driver torque request while the cylinder(s) are deactivated. The cylinder activation module 216 outputs the quantity of activated cylinders.

The number of active cylinders in the engine 102 affects the firing frequency of the engine 102. For example, at a given engine speed, decreasing the number of active cylinders from 8 to 4 may decrease the firing frequency of the engine 102 from 60 Hertz (Hz) to 30 Hz. In this example, the masking vibration level may be greater at 30 Hz than at 60 Hz. Thus, the cylinder activation module 216 may deactivate cylinders to adjust the frequency of vibration due to the engine 102 to the frequency of a masking vibration having a greater amplitude relative to the current masking vibration level.

A throttle control module 218 outputs a desired throttle position, and the throttle actuator module 116 adjusts the position of the throttle valve 112 to achieve the desired throttle position. The throttle control signal may indicate a desired throttle position. A fuel control module 220 generates a fuel control signal, and the fuel actuator module 124 controls fuel injection in the engine 102 based on the fuel control signal. The fuel control signal may indicate a desired fueling rate. A spark control module 222 generates a spark control signal, and the spark actuator module 126 controls the spark plug 128 based on the spark control signal. The spark control signal may indicate desired spark timing.

The throttle control module 218, the fuel control module 220, and the spark control module 222 may adjust the throttle position, the fueling rate, and the spark timing, respectively, to achieve the desired engine torque and/or the desired engine speed. In one example, the throttle control module 218 and the spark control module 222 adjust the throttle position and the spark timing based on the desired engine torque, and the fuel control module 220 adjusts the fueling rate based on the desired air/fuel ratio. In this example, the engine load control module 210 may ensure that the second vibration level is less than the first vibration level by adjusting the engine load.

Figure 3:
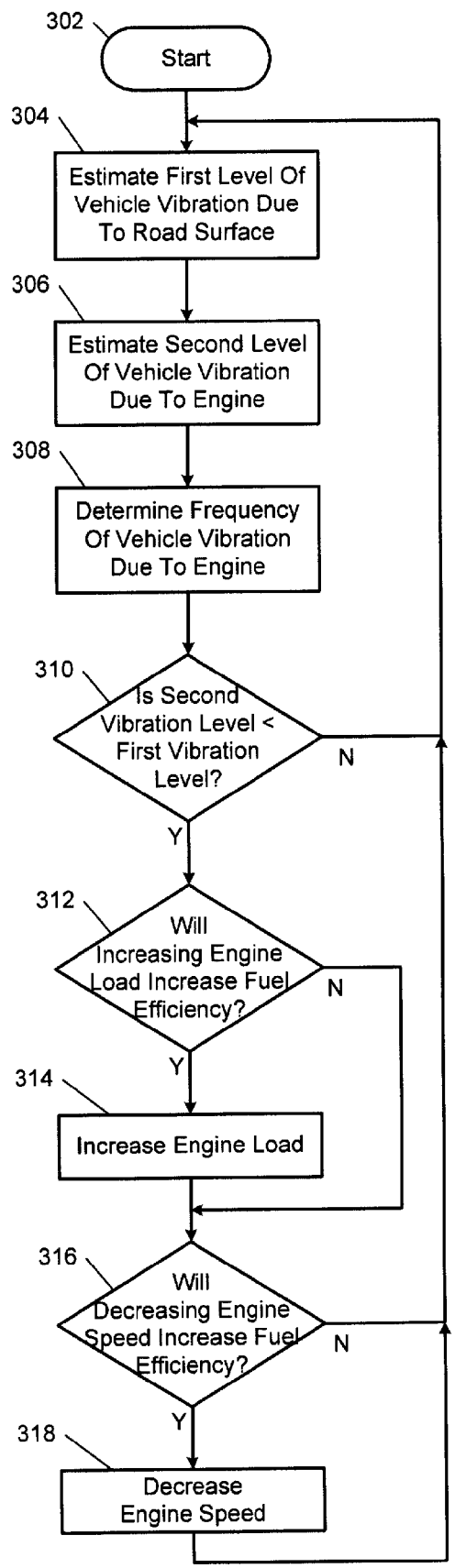
FIG. 3 is a flowchart illustrating an example control method according to the principles of the present disclosure.

Referring now to FIG. 3, a method for adjusting engine speed and/or engine load to improve fuel economy without causing vehicle vibration that is perceivable by a vehicle occupant begins at 302. At 304, the method estimates a first level of vehicle vibration due to contact between tires of a vehicle and a road surface. The method may estimate the first vibration level based on a transmission output speed, a wheel speed, a chassis acceleration, a suspension position, and/or a time derivative thereof.

At 306, the method estimates a second level of vehicle vibration due to an engine of the vehicle. The method may estimate the second vibration level based on a commanded engine torque based on a predetermined relationship between the commanded engine torque and the second vibration level. The predetermined relationship may be embodied in a lookup table and/or an equation.

At 308, the method determines a first frequency of vehicle vibration due to the engine based on a firing frequency of the engine. For example, the method may set the first frequency equal to the firing frequency of the engine. The method may estimate the first vibration level at a second frequency that is within a predetermined range of the first frequency. For example, at 304, the method may use a Fourier transform to obtain a frequency distribution of a signal indicating the transmission output speed, the wheel speed, the chassis acceleration, the suspension position, or a derivative or integral thereof. Then, at 308, the method may estimate the first vibration level based on a peak in the frequency distribution that is within a predetermined range of the first frequency.

At 310, the method determines whether the second vibration level is less than the first vibration level. If the second vibration level is less than the first vibration level, the method continues at 312. Otherwise, the method continues at 304.

At 312, the method determines whether increasing the engine load will increase the fuel efficiency of the engine. If increasing the engine load will increase the fuel efficiency of the engine, the method continues at 314. Otherwise, the method continues at 316. At 314, the method increases the engine load. Alternatively, the method may increase an upper limit that is applied to the engine load.

At 316, the method determines whether decreasing the engine speed will increase the fuel efficiency of the engine. If decreasing the engine speed will increase the fuel efficiency of the engine, the method continues at 314. Otherwise, the method continues at 316. At 314, the method decreases the engine speed. Alternatively, the method may decrease a lower limit that is applied to the engine speed.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
    a vibration level module that:
        estimates a first level of vibration in a vehicle due to contact between tires of the vehicle and a road surface as the vehicle travels over the road surface; and
        estimates a second level of vibration in the vehicle due to an engine in the vehicle; and
    an engine operation control module that selectively adjusts at least one of a speed of the engine and a load on the engine when the second vibration level is less than the first vibration level.

2. The system of claim 1 wherein the engine operation control module selectively decreases the engine speed when the second vibration level is less than the first vibration level.

3. The system of claim 2 wherein the engine operation control module decreases the engine speed when the second vibration level is less than the first vibration level and decreasing the engine speed increases a fuel efficiency of the engine.

4. The system of claim 1 wherein the engine operation control module selectively increases the engine load when the second vibration level is less than the first vibration level.

5. The system of claim 4 wherein the engine operation control module increases the engine load when the second vibration level is less than the first vibration level and increasing the engine load increases a fuel efficiency of the engine.

6. The system of claim 1 further comprising a vibration frequency module that determines a first frequency of the vehicle vibration due to the engine, wherein the vibration level module estimates the first vibration level at a second frequency that is within a predetermined range of the first frequency.

7. The system of claim 6 wherein the vibration level module:
    obtains a frequency distribution of the vehicle vibration due to contact between the tires of the vehicle and the road surface; and
    estimates the first vibration level based on a peak in the frequency distribution that is within the predetermined range of the first frequency.

8. The system of claim 1 wherein the vibration level module estimates the first vibration level based on at least one of a wheel speed, a transmission output speed, chassis acceleration, and suspension motion.

9. The system of claim 8 wherein the vibration level module estimates the first vibration level based on at least one of a time derivative and an integral of the at least one of the wheel speed, the transmission output speed, the chassis acceleration, and the suspension motion.

10. The system of claim 1 wherein vibration level module estimates the second vibration level based on a commanded engine torque.

11. A method comprising:
    estimating a first level of vibration in a vehicle due to contact between tires of the vehicle and a road surface as the vehicle travels over the road surface;
    estimating a second level of vibration in the vehicle due to an engine in the vehicle; and
    selectively adjusting at least one of a speed of the engine and a load on the engine when the second vibration level is less than the first vibration level.

12. The method of claim 11 further comprising selectively decreasing the engine speed when the second vibration level is less than the first vibration level.

13. The method of claim 12 further comprising decreasing the engine speed when the second vibration level is less than the first vibration level and decreasing the engine speed increases a fuel efficiency of the engine.

14. The method of claim 11 further comprising selectively increasing the engine load when the second vibration level is less than the first vibration level.

15. The method of claim 14 further comprising increasing the engine load when the second vibration level is less than the first vibration level and increasing the engine load increases a fuel efficiency of the engine.

16. The method of claim 11 further comprising:
    determining a first frequency of the vehicle vibration due to the engine; and
    estimating the first vibration level at a second frequency that is within a predetermined range of the first frequency.

17. The method of claim 16 further comprising:
    obtaining a frequency distribution of the vehicle vibration due to contact between the tires of the vehicle and the road surface; and
    estimating the first vibration level based on a peak in the frequency distribution that is within the predetermined range of the first frequency.

18. The method of claim 11 further comprising estimating the first vibration level based on at least one of a wheel speed, a transmission output speed, chassis acceleration, and suspension motion.

19. The method of claim 18 further comprising estimating the first vibration level based on at least one of a time derivative and an integral of the at least one of the wheel speed, the transmission output speed, the chassis acceleration, and the suspension motion.

20. The method of claim 11 further comprising estimating the second vibration level based on a commanded engine torque.

* * * * *